(No Model.)
V. L. WILLIAMS.
COMBINATION IMPLEMENT.
No. 458,122. Patented Aug. 18, 1891.
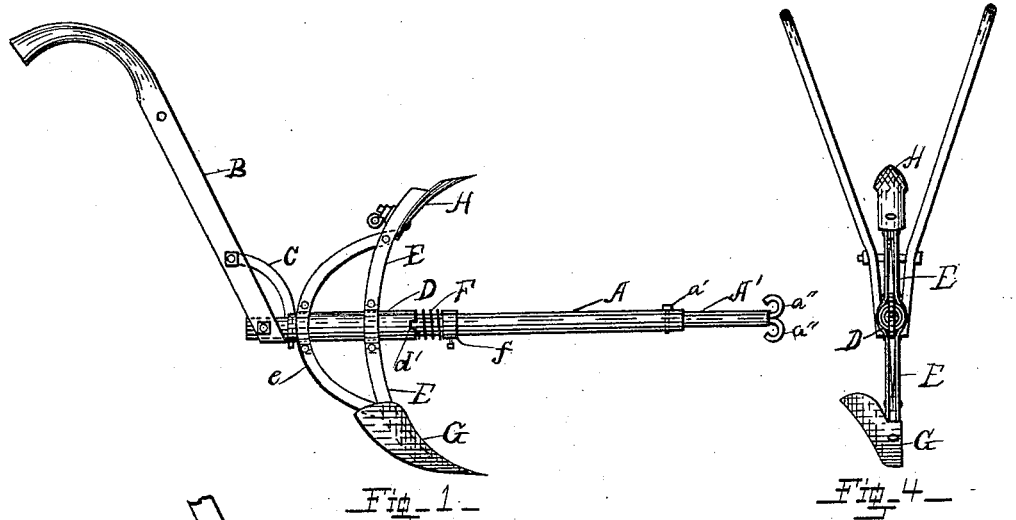
Fig. 1.
Fig. 4.
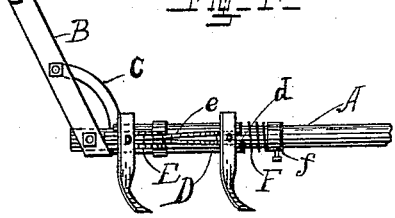
Fig. 2.
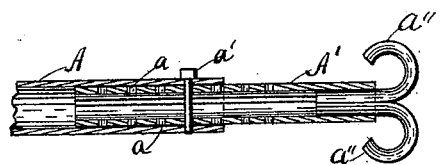
Fig. 5.
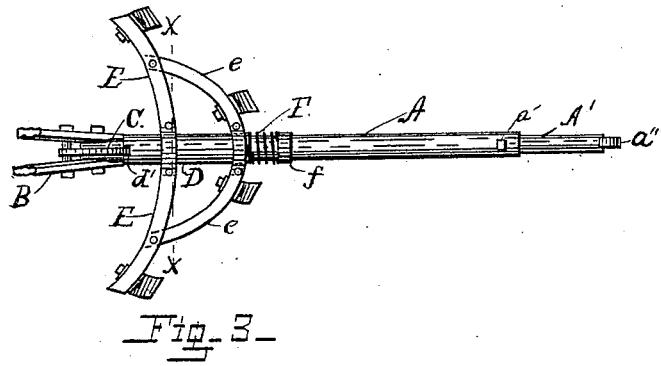
Fig. 3.
Fig. 6.
Witnesses
N. P. Wood
Walter Reeves
Inventor
Virgil L. Williams
Attorney

UNITED STATES PATENT OFFICE.

VIRGIL L. WILLIAMS, OF CLARKSTON, GEORGIA.

COMBINATION IMPLEMENT.

SPECIFICATION forming part of Letters Patent No. 458,122, dated August 18, 1891.

Application filed December 24, 1890. Serial No. 375,743. (No model.)

*To all whom it may concern:*

Be it known that I, VIRGIL L. WILLIAMS, a citizen of the United States, and a resident of Clarkston, in the county of De Kalb and State of Georgia, have invented certain new and useful Improvements in Combination Implements; and I do hereby declare the following to be a full, clear, and exact description of the invention, such as will enable others skilled in the art to which it appertains to make and use the same, reference being had to the accompanying drawings, and to letters of reference marked thereon, which form part of this specification.

This invention relates to the construction of a stock that will carry two plows and hold either in a position to work—for instance, one right-hand and one left-hand, or a turn-plow and a subsoil-plow—or that will be convertible into a harrow or cultivator and carry feet or teeth adapted to perform a great variety of work. The object is to furnish an implement that will do hillside plowing by turning the furrow downhill going both ways, or turn a furrow and subsoil with interchanging plows, and that will harrow the land and cultivate the growing crop.

The invention consists of a tubular beam adjustable in length, and of a sleeve revolving on the beam and carrying double standards, and of means for locking the sleeve and standards in the different required positions, the particulars of which will be hereinafter fully described, and are shown in the accompanying drawings, of which—

Figure 1 is a side elevation showing the device as arranged for turn-plowing and subsoiling. Fig. 2 is a side elevation showing the device as arranged for cultivating. Fig. 3 is a plan of the device as shown in Fig. 2. Fig. 4 is a front elevation of the device as shown in Fig. 1. Fig. 5 is an enlarged vertical longitudinal section through the front end of the beam, showing the means for adjusting the beam as to length. Fig. 6 is a cross-section through the beam on the line $x\,x$, Fig. 3, showing the way of attaching the double standard to the sleeve.

In the several figures, like reference-marks referring to like parts, A is the beam, into which telescopes the part A″, having a series of holes $a$, by means of which and the pin $a'$ the length of the beam may be adjusted. In the end of the part A′ are inserted two pieces of half-round iron $a''$, that may be welded or pinned in. These two pieces of iron $a''$ are bent outwardly and form two hooks for the attachment of the whiffletree, one being above the other, as shown in Figs. 1, 3, and 5. The handles B are attached to the beam at their bottom ends in any approved way, the attachment being strengthened by the brace C, that passes through and is fastened into the beam. The sleeve D fits loosely over the beam A and has rectangular notches $d$ and $d'$, as shown in Figs. 1, 2, and 3, said notches being in the two ends at a radial angle of forty-five degrees. These notches engage with the brace C and prevent the sleeve turning. These notches are on opposite sides of the sleeve at both ends.

The standards E are clamped, as shown, or otherwise fastened on the sleeve D in such position to the notches $d$ and $d'$ as will cause said standards to stand vertically when arranged to carry plows, as shown in Figs. 1 and 4, and horizontally when the sleeve is reversed to carry harrow or cultivator teeth, as shown in Figs. 2 and 3.

The brace C performs the double function of bracing the handles and of entering the notches $d$ or $d'$ to prevent the turning of the sleeve on the beam; but a separate pin might be used for the latter purpose. The construction shown, however, is thought to be best.

While in actual operation the draft of the plow will keep the notch $d$ or $d'$ in engagement with the pin or brace C; but the spring F is added to prevent its accidental disengagement at other times and to make it easy to reverse the plows, as will be hereinafter described. The spring F abuts against the collar $f$, that is fastened to the beam by a set-screw. The plows or teeth are attached to the standards by bolts, as usual, or by other means, if desired.

In using this implement for turning and subsoiling it should be arranged as shown in Figs. 1 and 4—that is to say, with the standards in a vertical position and with a forward inclination, the turn-plow G being on one standard and the subsoil-plow H on the other. After plowing a furrow with the turn-plow by pressing against the brace $e$ with the foot the operator forces the notch $d$ (best shown in Fig. 2) off the pin or brace C, which will allow the standards to be reversed by the revolving of the sleeve D on the beam, when the subsoil-plow will be held in position by the other or opposite notch $d'$ engaging with the brace C. It is obvious that this may be done with equal facility in plowing back and forth, as on a hillside, or in going around a "land." To do hillside plowing without subsoiling, it is necessary to have a right-hand plow on one standard and a left-hand plow on the other.

To convert the stock into a cultivator or harrow, the pin $a'$ and the part of the beam marked A' must be removed, as well as the collar $f$ and the spring F. The sleeve D should then be taken off, reversed endwise, and be put on with one of the notches $d'$ in engagement with the pin or brace C, as shown in Figs. 2 and 3, and cultivator or harrow teeth of any form can be attached. If two sets of teeth projecting in opposite directions from the standards E are required to be used alternately, the spring should be replaced, as shown in the drawings, otherwise, as a harrow or cultivator, the spring may be left off and the sleeve be pressed back and held by the collar $f$.

Having thus described my invention, what I claim as new, and desire to secure by Letters Patent of the United States, is—

1. In a device of the class described, the beam A, the sleeve D, carrying standards E E and having notches $d$, the pin or brace C, and the spring F, and collar $f$, substantially as shown and described.

2. In an extensible plow-beam of the class described, the combination of a cylindrical beam with the part A', having holes $a$, and the pin $a'$, passing through said beam and the part A', for the purpose described.

3. In a combination implement, the beam A, the sleeve D, carrying standards E E and having notches $d$ and $d'$, the pin or brace C, and means, substantially as described, for holding either of said notches in engagement with the pin or brace C, for the purpose specified.

In testimony whereof I hereunto affix my signature in presence of two witnesses.

VIRGIL L. WILLIAMS.

Witnesses:
A. P. WOOD,
ALBERT A. WOOD.